United States Patent
Mamidwar et al.

(10) Patent No.: US 8,155,506 B2
(45) Date of Patent: Apr. 10, 2012

(54) SYSTEM AND METHOD FOR TRANSPORT PID VERSION CHECK

(75) Inventors: Rajesh Mamidwar, San Diego, CA (US); Francis Chi-Wai Cheung, Del Mar, CA (US); Ut T. Nguyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1801 days.

(21) Appl. No.: 11/332,960

(22) Filed: Jan. 17, 2006

(65) Prior Publication Data

US 2007/0166002 A1  Jul. 19, 2007

(51) Int. Cl.
*H04N 5/76* (2006.01)
(52) U.S. Cl. .................................. 386/291; 348/E5.097
(58) Field of Classification Search ............... 386/69, 386/83, 291; 348/E5.097; 725/58
See application file for complete search history.

(56) References Cited

U.S. PATENT DOCUMENTS

| | | | |
|---|---|---|---|
| 6,356,567 B2* | 3/2002 | Anderson et al. | 370/516 |
| 2001/0036201 A1* | 11/2001 | Dieterich et al. | 370/506 |
| 2002/0093517 A1* | 7/2002 | Cheung | 345/629 |
| 2005/0036515 A1* | 2/2005 | Cheung et al. | 370/487 |
| 2007/0101373 A1* | 5/2007 | Bodlanender et al. | 725/86 |
| 2009/0214042 A1* | 8/2009 | Nakahara et al. | 380/278 |

* cited by examiner

*Primary Examiner* — Thai Tran
*Assistant Examiner* — Girumsew Wendmagegn
(74) *Attorney, Agent, or Firm* — Thomas, Kayden, Horstemeyer & Risley, LLP

(57) ABSTRACT

Systems and methods for processing media information are disclosed and may include tracking a number of times that at least one stored identifier that identifies program content for a particular data channel that is received via one of a plurality of multiplexed transport data streams is modified. At least a portion of the received program content for the particular data channel may be discarded based on the tracking. The at least one stored identifier that identifies the program content for the particular data channel may include a packet identifier (PID) and a processor identifier associated with the PID that identifies at least one of a plurality of processors that parses at least a portion of the program content for the particular data channel that is received via one of the plurality of multiplexed transport data streams.

24 Claims, 9 Drawing Sheets

US 8,155,506 B2

SYSTEM AND METHOD FOR TRANSPORT PID VERSION CHECK

RELATED APPLICATIONS

This application makes reference to U.S. patent application Ser. No. 11/332,936, filed on even date herewith, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate generally to processing of packetized data. More specifically, certain embodiments of the invention relate to a system and method for a transport packet identifier (PID) version check.

BACKGROUND OF THE INVENTION

As the speed of Internet traffic increases, on-demand television and video are becoming closer and closer to reality. The introduction of broadband networks, headend and terminal devices such as set-top boxes, and media such as DVD disks recorded with digitally compressed audio, video and data signals, for example, which utilize motion Picture Expert Group (MPEG) compression standards, may provide sound and picture quality that is virtually indistinguishable from the original material. One of the most popular MPEG standards is MPEG-2, which provides the necessary protocols and infrastructure that may be used for delivering digital television or DVD contents with compressed audio, video and data signals. The MPEG-2 compression scheme compresses and packetizes the video content into MPEG-2 packets. A detailed description of the MPEG-2 standard is published as ISO/IEC Standard 13818.

In addition to the increasing speed of Internet transactions, continued advancement of motion picture content compression standards permit high quality picture and sound while significantly reducing the amount of data that must be transmitted. A compression standard for television and video signals was developed by the Moving Picture Experts Group (MPEG), and is known as MPEG-2. An encoded bitstream, such as an MPEG-2 bitstream, comprises different types of data. For example, an MPEG-2 bitstream may comprise audio information, video information, and additional data. A transmitted MPEG-2 bitstream may be received by a set-top box (STB), for example, and the STB may further process the received bitstream. However, since the received bitstream comprises multiple types of data, the STB may utilize multiple tuners. Using multiple tuners to parse the received bitstream is time consuming and may result in processing delays. Furthermore, the STB may be utilized to change a current programming channel. However, after a programming channel is changed, previously processed data or "old" data is still left at various stages of the STB data pipeline. The previously processed data that is left in the STB data pipeline causes artifacts after the programming channel is changed.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a transport packet identifier (PID) version check, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a transport packet identifier (PID) version check. A set-top box (STB) or other bitstream processing circuitry may utilize a plurality of parsers that parse a received bitstream, such as an MPEG-2 bitstream. Parsed data may be tagged with a data tag and may be communicated to a decoder for further processing. The data tag may comprise a PID version and PID channel information. The PID version may indicate the number of times PID information corresponding to the PID version was previously modified. Prior to decoding, the particular PID version from the data tag may be compared to a PID version of a current PID channel. If the PID version from the data tag does not match the PID version of the current PID channel, the parsed data associated with the tagged PID version may be discarded prior to decoding. In this regard, the appearance of artifacts from old data after a channel change may be avoided.

Figure 1A:
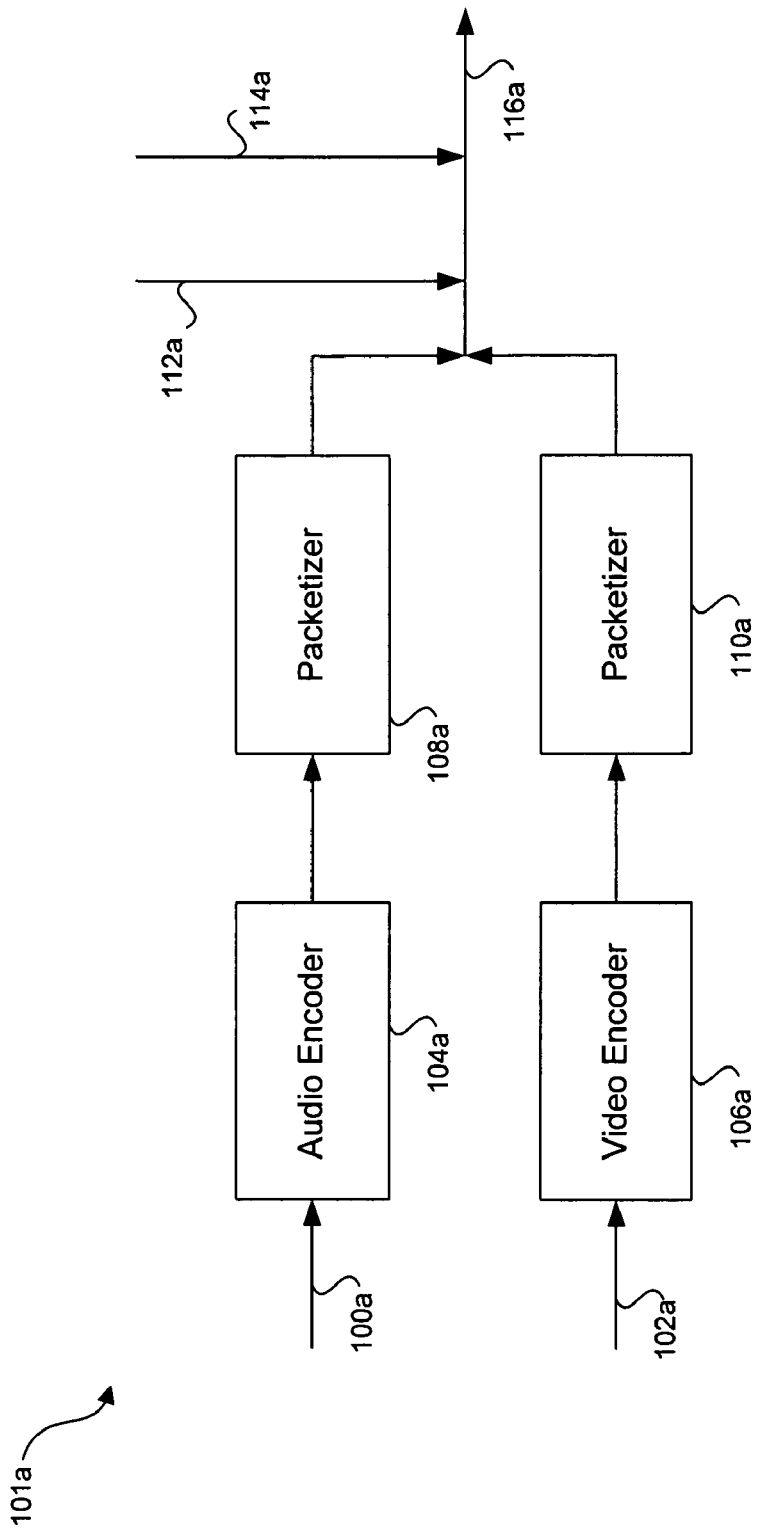
FIG. 1A is a block diagram of an exemplary system for encoding an MPEG stream, which may be utilized in accordance with an embodiment of the invention.

FIG. 1A is a block diagram of an exemplary system for encoding an MPEG stream, which may be utilized in accordance with an embodiment of the invention. Referring to FIG. 1A, the exemplary system 101a for encoding an MPEG bitstream may comprise an audio encoder 104a, a video encoder 106a, and packetizers 108a, 110a. The audio encoder 104a may comprise suitable circuitry, logic, and/or code and may be enabled to encode audio information 100a. The video encoder 106a may comprise suitable circuitry, logic, and/or code and may be enabled to encode video information 102a. The packetizers 108a and 110a may comprise suitable circuitry, logic, and/or code and may be adapted to arrange encoded audio and video information, respectively, into packets for transmission.

In operation, the audio encoder 104a may encode the audio information 100a to generate an audio elementary stream (ES). The packetizer 108a may then packetize the audio ES. Similarly, the video encoder 106a may encode the video information 102a to generate a video ES. The packetizer 110a may then packetize the video ES. In MPEG-2, the audio ES and video ES may encapsulate additional information, such as decoding and presentation timestamps, to generate packetized elementary streams (PES). The PES may include a header that may precede one or more payload bytes. The header may include information pertaining to the encoding process required by an MPEG decoder to decompress and decode a received ES. Each individual ES may have a corresponding PES and any encoded audio and video information may still reside in separate PESs. Notably, the PES may be viewed primarily as a logical construct and may not be utilized for data interchange, transport, and interoperability. Notwithstanding, the PES may be utilized for conversion between two types of system streams, namely, TS and program stream (PS).

The audio and video PES may be combined with packets containing additional data 112a and program specific information (PSI) 114a. The PSI 114a may comprise tables, which may be necessary for de-multiplexing the TS 116a in a receiver. All these streams may be encoded and multiplexed into an MPEG transport stream (TS) 116a for transmission. To maintain synchronization and timing, null packets may also be inserted to fill the intervals between information-bearing packets. Timing information for an associated program may be carried by specific packets. The TS 116a may be modulated for transmission via local television digital broadcast, for example. The TS 116a may be de-multiplexed, and compressed video and audio streams may be decoded in a set-top box (STB) and viewed on a TV. The STB may utilize one or more parsers to parse and demultiplex the received TS 116a. In this regard, the parsers may utilize PID information, which may be stored in a table in memory, to determine whether to accept or reject a particular packet from the received TS 116a. TS packets may have a fixed length of 188 bytes, which may include a header having a minimum size of 4 bytes and a maximum payload of 184 bytes.

In existing MPEG compliant systems, audio/video streams may be carried using MPEG-2 transport packets. Multiple streams may be differentiated using a PID contained in a packet header called the transport packet header. Transport packets from various streams may be multiplexed and transmitted on the same physical medium. Exemplary media may include, copper, coaxial cable, wireless, optical and any combination thereof. On the receiver side transport packets may be de-multiplexed and data may be separated for each stream. For example, audio packets may be extracted from the transport stream and separated from video packets utilizing PID information.

Transport packets may include three fields, namely a 4-byte header, an optional adaptation field and a packet payload. The packet payload may not be altered by multiplexing or transmitting equipment, except during processing which may include data encryption and decryption. Encryption may be performed once within a typical MPEG processing system. Notwithstanding, some fields of adaptation field may be changed by multiplexing and transmission equipment. Typically, packet order within a PID channel may be maintained from an MPEG encoder to an MPEG receiver but packet order among multiple PID streams may not be guaranteed by during transmission by any transmitting equipment. In cases where correlation of packets from different PIDs may be required, packet position in a stream cannot be utilized since packet order among multiple PID channels may be altered.

Figure 1B:
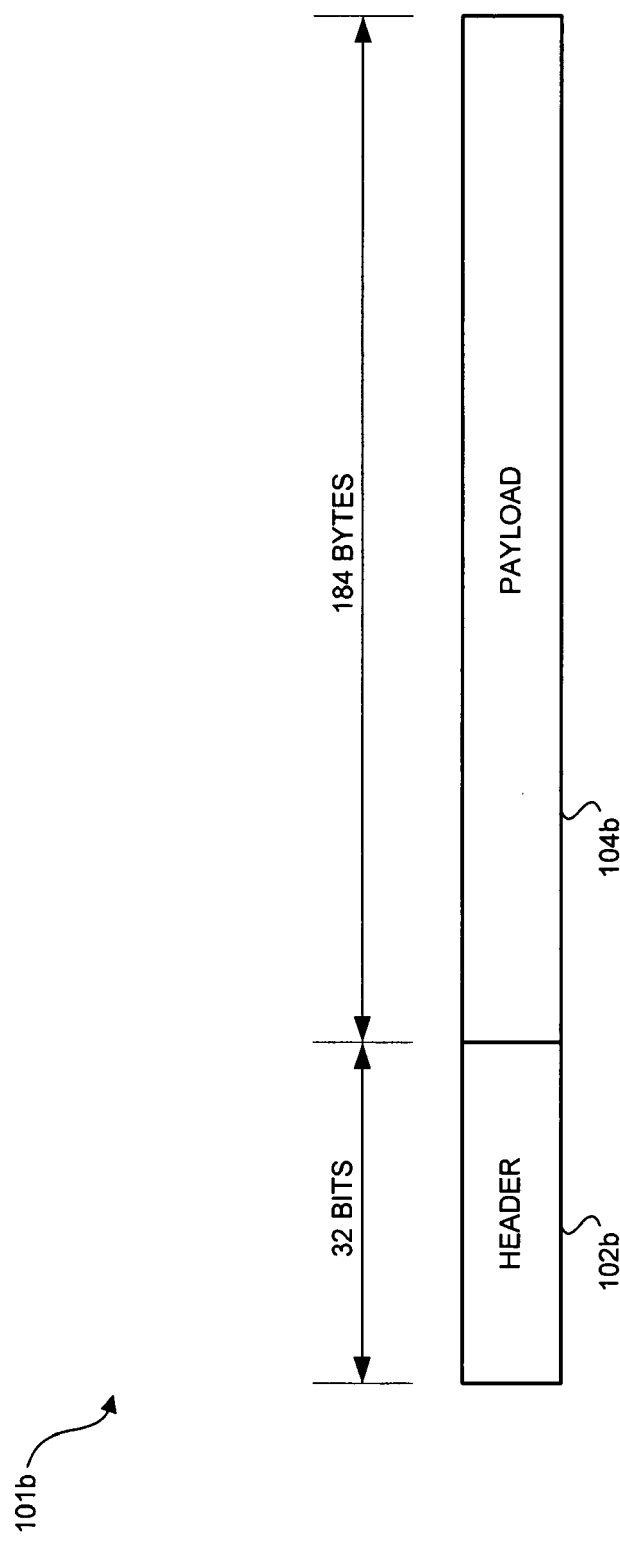
FIG. 1B is a block diagram of an exemplary packet in an MPEG stream.

FIG. 1B is a block diagram of an exemplary packet in an MPEG stream. Referring to FIG. 1B, the MPEG-2 packet 101b may comprise a header 102b and a payload 104b. The header 102b may comprise 32 bits and the payload 104b may comprise 184 bytes. In this regard, an MPEG-2 packet 101b may comprise 1504 bits.

MPEG-2 packets, such as packet 101b, may be received within a STB as a continuous stream of serial data. Recovery of the original video and/or audio content may require parsing the continuous stream of serial data into the individual constituent packets. Given the starting point of an MPEG-2 packet, a transport stream receiver may be enabled to parse the continuous stream into the individual constituent data packets by counting the number of bits received since the MPEG-2 packets are of a known uniform length of 1504 bits. The starting point of a packet, such as packet 101b, may be determined by calculation and detection of a predetermined eight-bit checksum, for example. Detection of the predetermined checksum may be indicative of the beginning of the MPEG-2 packet 101b. In addition, detection of the predetermined checksum may be used to establish MPEG synchronization and lock alignment. Once alignment has been locked, the absence of the predetermined checksum at expected locations, such as every 1504 bits, may be indicative of bit errors.

Figure 1C:
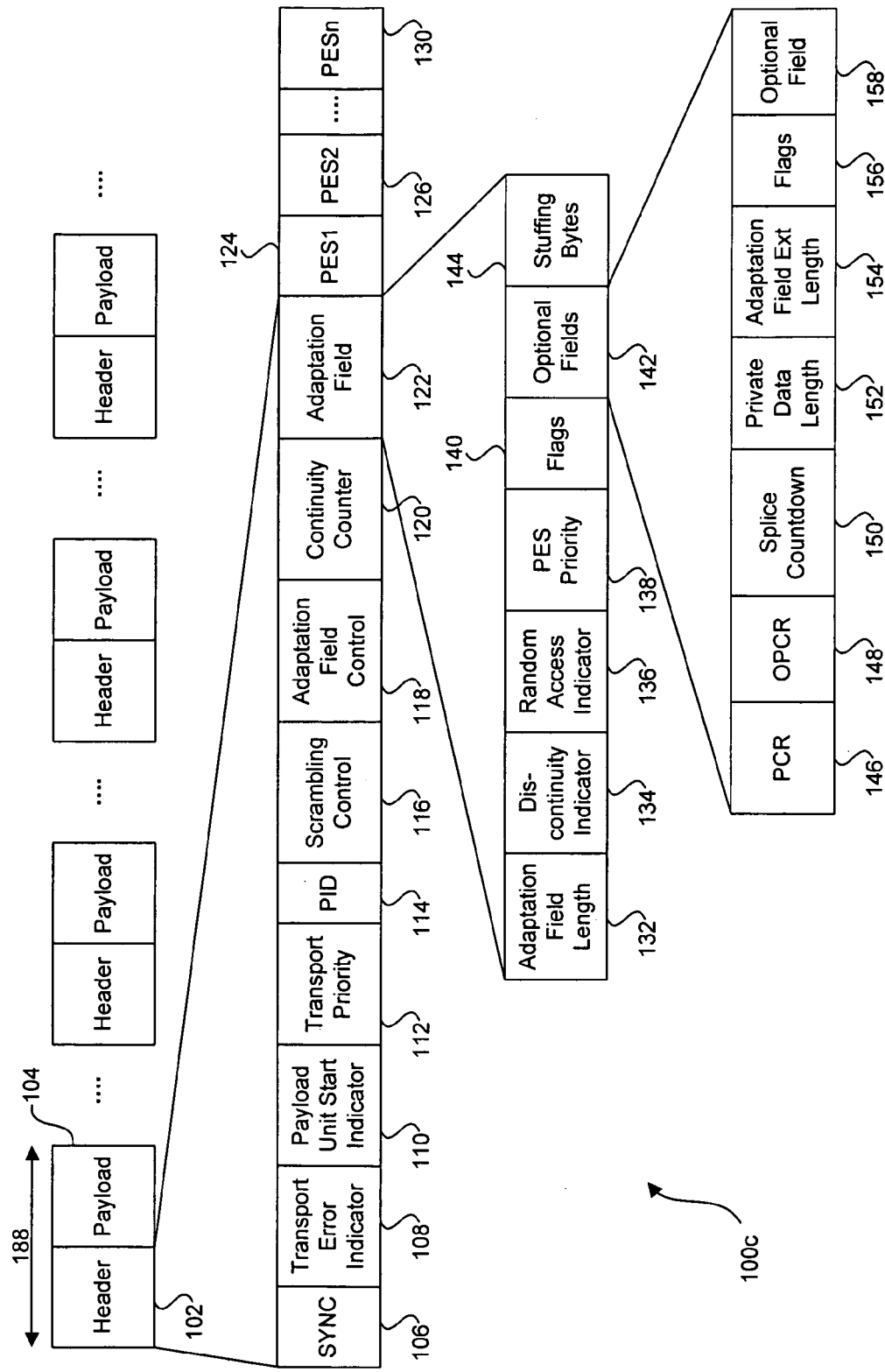
FIG. 1C is a diagram of the structure for an exemplary MPEG transport stream, in accordance with an embodiment of the invention.

FIG. 1C is a diagram of the structure for an exemplary MPEG transport stream, in accordance with an embodiment of the invention. Referring to FIG. 1C, the transport stream (TS) 100c may comprise a plurality of TS packets. Each TS packet may comprise a header 102 and payload 104, which may total 188 bytes. The TS packet header 102 may include the following fields: synchronization (SYNC) 106, transport error indicator 108, payload unit start indicator 110, transport priority 112, packet identifier (PID) 114, transport scrambling control 116, adaptation field control 118, continuity counter 120, and adaptation field 122. The adaptation field 122 may further comprise the following fields: adaptation field length 132, discontinuity indicator 134, random access indicator 136, ES priority 138, flags 140, optional fields 142, and stuffing bytes 144. The optional fields 142 may further comprise the following: program clock reference (PCR) 146, OPCR 148, a splice countdown 150, private data length 152, adaptation field extension length 154, flags 156, and optional field 158. The payload 104 may be comprise a plurality of PES, such as PES1 124, PES2 126, . . . , PESn 130.

The TS 100c may comprise variable length PESs that may be divided into fixed length packets for use by a transmission system. In this regard, the information added by the TS 100c may be additional to the information contained in the headers of the PESs. SYNC byte 106 may be used to delineate the beginning and ending of TS packet 100c. The transport error indicator 108 may indicate when there is an error in a packet or block. This may be particularly useful for error block detection.

The packet identifier (PID) 114 may be a unique identifier that may identify every video and audio stream. Additionally, each PID table may have a unique PID 114. The PID 114 may be utilized for identifying a channel and may include any information required for locating, identifying and reconstructing programs. The PID may identify packets belonging to the same data stream, which facilitates reconstruction of the data stream within a STB, for example. Some PIDs may be reserved for specific uses by the MPEG protocol. PID values may be stored in PSI tables, for example, within the bitstream receiver, such as the STB. In order to ensure that all the audio, video and data for a program are properly decoded, it may be critical to ensure that the PIDs are correctly assigned and that the PID tables correspond with their associated audio and video streams.

The PCR 146 may comprise 42 bits, which may represent 27 MHz clock ticks, and 33 bits of PCR base may represent 90 kHz ticks. The bits in PCR 146 may provide program clock recovery information that may be utilized for synchronization. PCR 146 may be used to provide a clock recovery mechanism for MPEG programs. A 27 MHz system time clock (STC) signal may typically be used for encoding MPEG signals. Decoding of the signal requires a clock that may be locked to the encoder's STC of 27 MHz. Notably, the PCR 146 may be utilized by the decoder to regenerate a local clock signal that is locked to the STC. Whenever a program is placed in the transport stream, a 27 MHz time stamp may be inserted into the PCR 146. When a decoder receives the signal, the decoder may compare the value in the PCR 146 with the frequency of its local voltage controlled oscillator (VCO) and adjust the VCO to ensure that the VCO is locked to the frequency specified by the PCR 146. To ensure accuracy, the PCR 146 may be updated with the STC every about 100 ms.

The continuity counter (CC) 120 may be used to determine when packets are lost or repeated. It may include a 4-bit field, which may be repeatedly incremented from zero to 15 for each PID. Discontinuity indicator 134 may permit a decoder to handle discontinuities in the transport stream. Discontinuity indicator 134 may indicate a time base such as the PCR 146 and continuity counter 120 discontinuities. Random access indicator 136 may be configured to indicate whether the next PES packet in the PID stream contains a video-sequence header or the first byte of an audio frame. Splice countdown 150 may be configured to indicate the number of packets of the same PID number to a splice point occurring at the start of PES packets.

An MPEG TS may be a multi-program TS or a single program TS (SPTS). A number of SPTSs may be multiplexed to create a multi-program TS. In some cases, the program may include one or more ESs that may have a similar time reference. This may occur, for example, in a movie that has video and its corresponding audio content.

PSI may include a set of tables that may be part of a TS. The tables in the PSI may be required while de-multiplexing the TS and for matching PIDs to their corresponding streams. Once the PIDs are matched to their corresponding streams, the TS may be decoded by assembling and decompressing program contents. Typically, in order to determine which audio and video PIDs contain the corresponding content for a particular stream, a program map table (PMT) may be decoded. Each program may have its own PMT bearing a unique PID value. The PAT may be decoded in order to determine which PID contains the desired program's PMT. The PAT may function as the master PSI table with PID value always equal to 0. In a case where the PAT cannot be found and decoded in the TS, no programs may be available for presentation. Each parser within an MPEG demultiplexer may access PID information for a particular data channel and received MPEG transport stream may be parsed based on the PID information.

The PSI table may be refreshed periodically at a rate that is fast enough to allow a STB to go through program recovery and decompression processes. This may be necessary to ensure real-time user interaction. The PSI may also be used to determine the accuracy and consistency of PSI contents. Notwithstanding, during programs changes or modification of multiplexer provisioning, there may be packets which have a PID value present in the TS, but have no corresponding reference in the PSI. Additionally, the PSI may have references to one or more packets in the PID that are not present in the TS.

Figure 2:
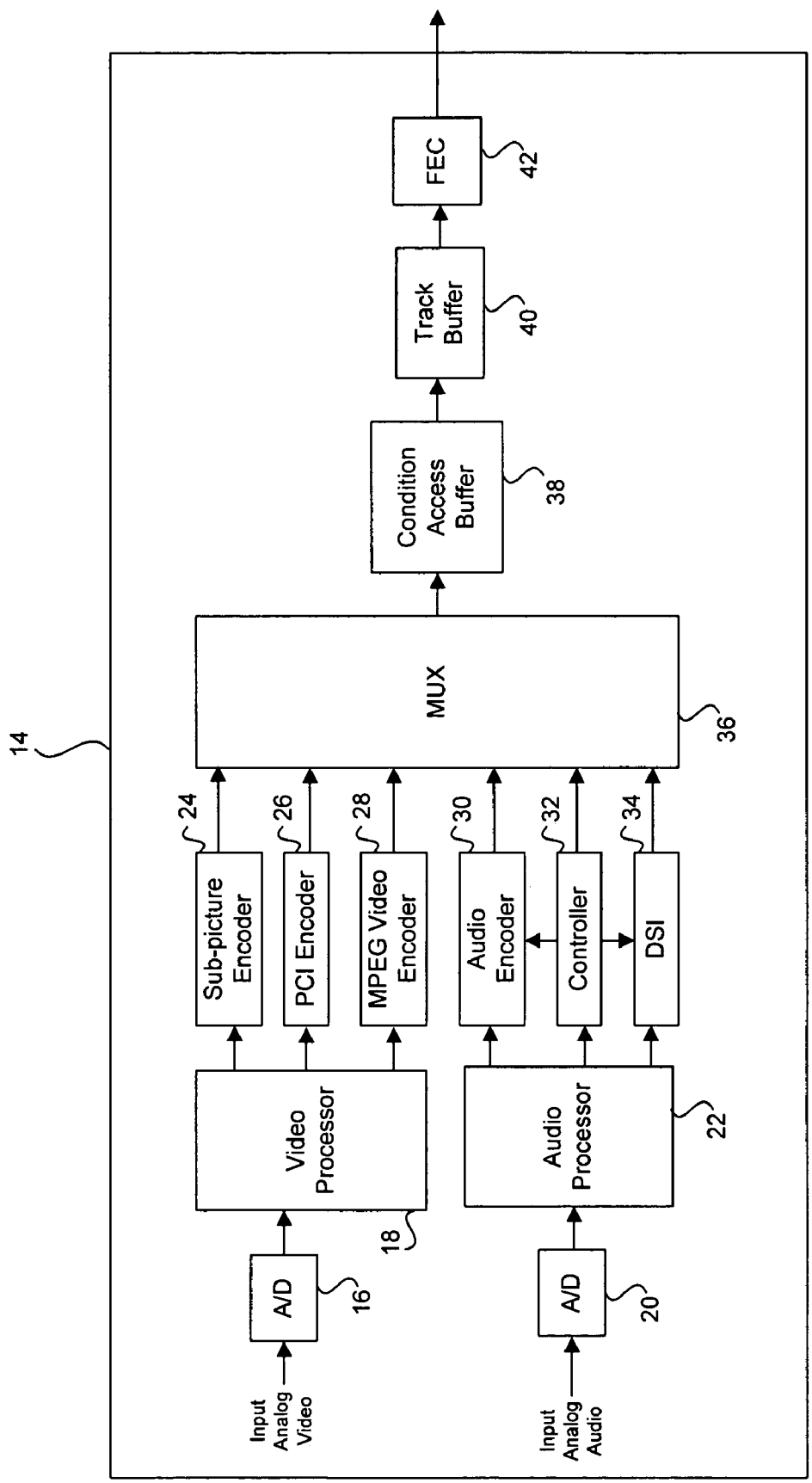
FIG. 2 is a block diagram of an exemplary MPEG encoding system that may be utilized in accordance with an embodiment of the invention.

FIG. 2 is a block diagram of an exemplary MPEG encoding system that may be utilized in accordance with an embodiment of the invention. Referring to FIG. 2, an analog input video signal may be converted to digital format by A/D converter 16. An output signal from the A/D converter 16 may be communicated to video processor 18 for processing. After the video processor 18 processes the signal, the output signal generated from the video processor 18 may be sent to a sub-picture encoder 24 for processing. A presentation control information (PCI) encoder 26 may be configured to encode PCI data for the video signal processed by video processor 22. The output signal generated from the video processor 18 may also be received and processed by an MPEG video encoder 28, which may be configured to format the video signal in MPEG format.

An analog input audio signal may be converted to digital format by A/D converter 20. An output signal from the A/D converter 20 may be communicated to audio processor 22 for processing. After the audio processor 22 processes the signal, the output signal generated from the audio processor 22 may be sent to an audio encoder 30 to be encoded in a suitable format. A data search information (DSI) encoder 34 may be configured to encode indexing and search data for the video signal processed by video processor 22. The outputs from the sub-picture encoder 24, PCI encoder 26, MPEG video encoder 28, audio encoder 30 and DSI encoder 34 may be multiplexed into a single data stream, by multiplexer 36. A controller 32 may be configured to control the operations of audio encoder 32, DSI encoder 34 and multiplexer (MUX) 36. The output of the MUX 36 may include a single steam, which may contain various kinds of PES. The PES may include, audio, video, PCI, DSI and sub-picture information.

The MPEG encoding system 14 may also include a conditional access buffer 38 that may be configured to control propagation of the packets through MUX 36. A track buffer 40 may be used to buffer and assemble data packets for further processing. Finally, the assembled packets may be encoded with a forward error correction algorithm within the forward error correction block (FEC) 42 for transmission over a channel. The output of the FEC block 42 may be an MPEG formatted digital audio/video signal.

Figure 3:
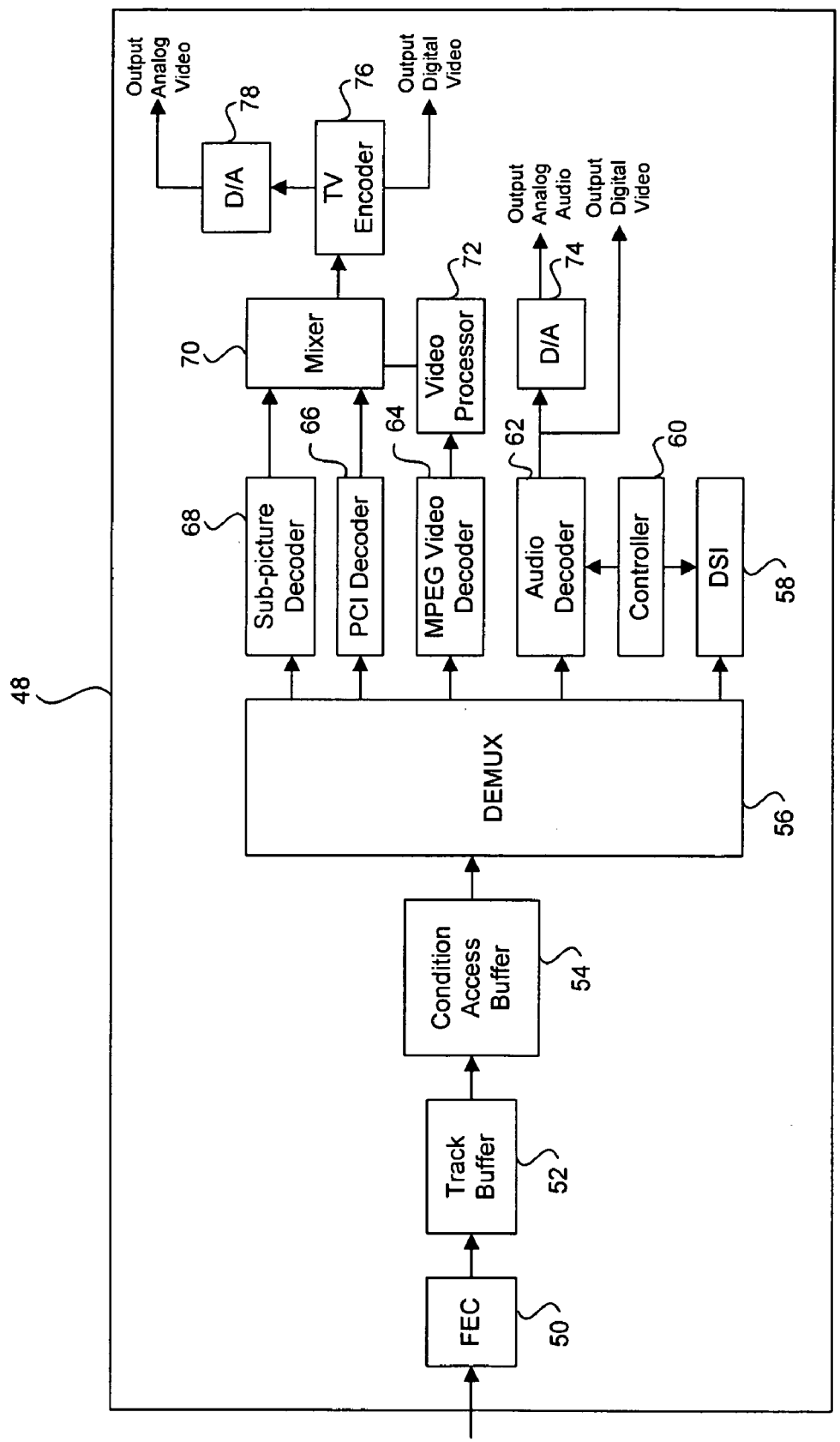
FIG. 3 is a block diagram of an exemplary MPEG decoding system that may be utilized in accordance with an embodiment of the invention.

FIG. 3 is a block diagram of an exemplary MPEG decoding system that may be utilized in accordance with an embodiment of the invention. The MPEG decoding system 48 may be, for example, a set-top box. Referring to FIG. 3, the MPEG decoding system 48 may comprise a forward error correction (FEC) processing block 50 and a track buffer 52. The track buffer 52 may be used to buffer and assemble data packets for further processing. The packets may be processed by a conditional access circuit 54 that may be configured to control propagation of the packets through de-multiplexer (DEMUX) 56 and into respective video and audio processing paths. The output of the DEMUX 56 may include various kinds of packetized elementary streams (PES), including audio, video, presentation control information (PCI), sub-picture information, and data search information (DSI) streams. The de-multiplexed PCI in the PES may be buffered prior to being decoded by. PCI decoder 66.

The sub-picture information in the PES may be buffered and decoded by sub-picture decoder 68. MPEG video decoder 64 may decode the de-multiplexed video stream in the PES. Video processor 72 may be configured to process the output from the MPEG video decoder 64. Video processor 72 may be a microprocessor or an integrated circuit (IC). Subsequent to processing of the MPEG video, mixer 70 may combine the outputs of the PCI decoder 66, the video processor 64 and the sub-picture decoder 68 to form a composite video signal. The output of mixer 70 may thereafter be encoded in a conventional television signal format such as PAL, SECAM, or NTSC by the TV encoder 76. The output of the TV encoder 76 may be a digital video signal. However, D/A converter 78 may convert this digital video output signal to an analog video output signal.

The audio portion of the PES may be buffered and decoded by audio decoder 62. The output of the audio decoder 62 may be a digital audio signal. The audio D/A 74 may process digital audio received from the audio decoder 62 and produce an analog audio output signal. Audio decoder 62 may include a frame buffer sufficient for temporarily storing audio frames prior to decoding. Controller 60 may control the operation of audio decoder 62 and DSI 58. Controller 60 may be configured to utilize DMA to access to data in track buffer 52 or any other associated memory (not shown).

Figure 4:
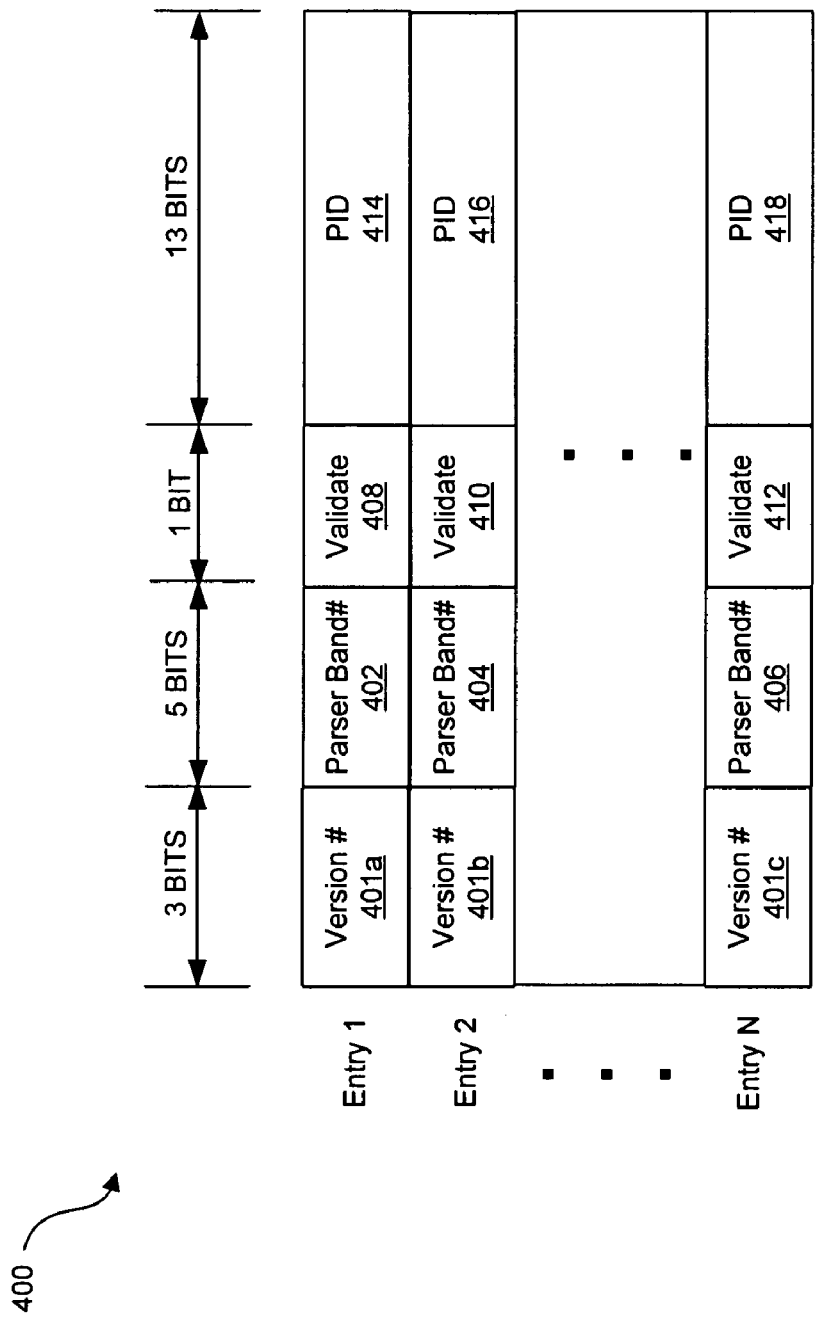
FIG. 4 is an exemplary packet identification (PID) table, in accordance with an embodiment of the invention.

FIG. 4 is an exemplary packet identification (PID) table, in accordance with an embodiment of the invention. Referring to FIG. 4, the PID table 400 may comprise a plurality of N entries, entry 1, . . . , entry N. Each of the N entries may comprise a PID version number field, a parser band number field, a validate bit field, and a PID field. In this regard, the PID table 400 may comprise version number fields 401*a*, . . . , 401*c*, parser band number fields 402, . . . , 406, validate bit fields 408, . . . , 412, and PID fields 414, . . . , 418.

The PID version number field may be, for example, 3 bits. The parser band number field may be, for example, 5 bits. The validate bit field may be 1 bit, and the PID field may be, for example, 13 bits. The PID version number field may comprise information identifying the number of times the parser band number, the validate bit and the PID information from the same table entry is modified. In this regard, each of the N version number fields 401*a*, . . . , 401*c* may be incremented automatically by hardware every time information from the corresponding PID table entry is accessed. In one embodiment of the invention, the PID version number field may be utilized for discarding previously processed data after a data channel is changed, for example, thereby preventing the appearance of artifacts associated with the preprocessed data.

The parser band number field may comprise information identifying a parser that may utilize the corresponding PID from the PID field. The validate bit may be asserted or de-asserted. If the validate bit is asserted, a parser identified by the corresponding parser band number may utilize the PID from the corresponding PID field to parse received transport stream data. If the validate bit is de-asserted, the PID stored in the corresponding PID field may not be utilized by any parser. The PID value field may comprise a PID value that may be used by a parser, for example, during parsing of received MPEG transport stream.

Entries in the PID table 400 may be indexed according to a data channel number for the PID stored in the corresponding PID entry. For example, PID 414 is located in entry 1 and, therefore, PID 414 may be used for parsing transport stream (TS) data associated with data channel 1. The version number field 401*a* may store information identifying the number of times bitstream data associated with data channel 1 is accessed. Similarly, PID 418 is located in entry N and, therefore, PID 418 may be used for parsing TS data associated with data channel N. The version number field 401*c* may store information identifying the number of times bitstream data associated with data channel N is accessed. In one embodiment of the invention, the data channel may comprise a PID channel. The PID table 400 may be stored in memory and may be accessed by one or more parsers within an MPEG transport processor, for example, during parsing of received TS data.

Figure 5:
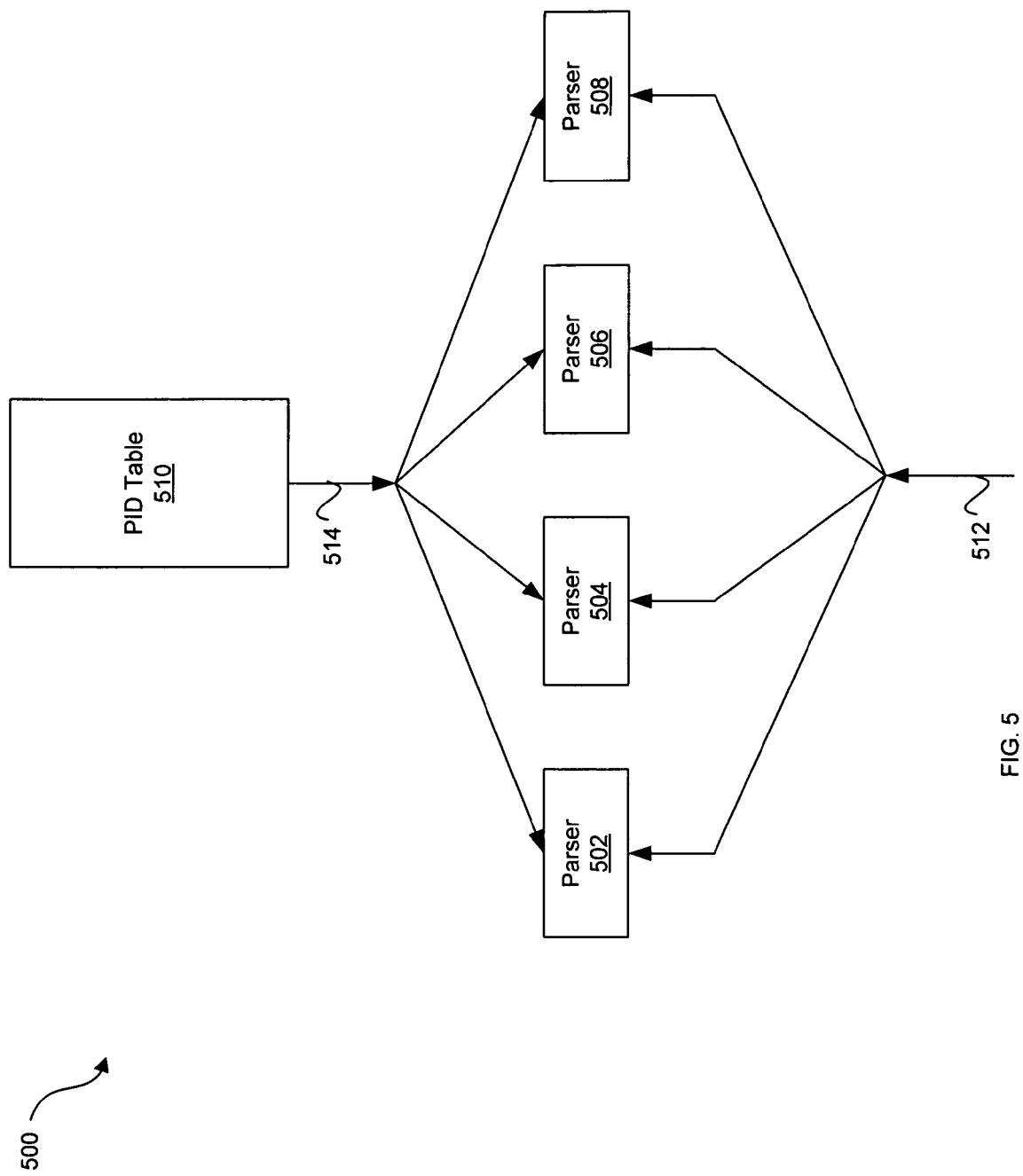
FIG. 5 is a block diagram illustrating an exemplary system for parsing a transport stream utilizing a PID table, in accordance with an embodiment of the invention.

FIG. 5 is a block diagram illustrating an exemplary system for parsing a transport stream utilizing a PID table, in accordance with an embodiment of the invention. Referring to FIG. 5, the system 500 for parsing a transport stream may comprise a PID table 510 and the parsers 502, . . . , 508. The system 500 may be utilized within an MPEG transport processor, for example, to parse a received transport stream such as the transport stream 512. The transport stream 512 may comprise an MPEG-encoded transport stream and may indicate program content for a plurality of data channels. In one embodiment of the invention, the stream 512 may comprise a plurality of transport streams.

The PID table 510 may be stored in memory and may be similar to the PID table 400 in FIG. 4. In this regard, the PID table 510 may comprise a plurality of entries, and each entry may comprise a PID version number, a parser band number entry, a validate bit entry, and a PID. The parsers 502, . . . , 508 may comprise suitable circuitry, logic, and/or code and may be adapted to parse data content, associated with one or more data channels, within a received transport stream 512. The parsers 502, . . . 508 may be identified by a parser band number. The parser band number may be utilized by each parser to accept or reject table entries from the PID table 510. For example, the parser 502 may be identified as parser band number 1. Similarly, the parser 508 may be identified as parser band number 4. After parsing, parsed information may be communicated to a decoder, for example, for further processing and decoding.

In one embodiment of the invention, parsed information may be tagged with a corresponding PID version number and a PID channel number. In this regard, prior to decoding the parsed information, the tagged PID version number may be compared with a current PID version number associated with the PID channel. If a data channel is changed, the current PID version will be incremented. Consequently, if the tagged PID version number is not identical to the current PID version number, the parsed information associated with the tagged PID version number may be discarded, which may significantly reduce the appearance of artifacts after the data channel is changed.

In an exemplary embodiment of the invention, contents of the PID table 510 may be continuously transmitted to each the parsers 502, . . . , 508. The system 500 may receive a transport stream, such as the transport stream 512, which may be communicated to the parsers 502, . . . , 508. The table entries from the PID table 510 may be communicated simultaneously to each of the parsers 502, . . . , 508. For example, the parser 502 may receive the transport stream 512 and may enable parsing of content associated with a particular data channel. As table entries from the PID table 510 are broadcasted to the parser 502, the parser 502 may accept or reject a table entry based on the parser band number field in each received PID table entry. Referring to FIGS. 4 and 5, the PID table 510 may be the same as PID table 400. During the simultaneous broadcasting of the PID table entries from PID table 510, the parser 502 may initially read the parser band number from each of the PID table entries.

Since the parser 502 is identified as parser band number 1, for example, the parser 502 may accept PID table entries with parser band number field equal to 1, and reject all other PID table entries. For example, if the parser band number field 402 equals 1, the parser 502 may accept entry 1 from PID table 400. The parser 502 may then check whether the validate bit 408 is asserted or de-asserted. If the validate bit 408 is asserted, the parser 502 may obtain the corresponding PID from PID entry 414. The parser 502 may then parse program content within the transport stream 512 based on the PID obtained from PID table entry 414. In this regard, the parser 502 may parse packets which have the same PID number stored within the packet headers of program content within the transport stream 512. If the PIDs from the packet headers do not match the PID obtained from the corresponding entry in the PID table, the parser 502 may reject the packets. Alternatively, if the PIDs from the packet headers match the PID obtained from the corresponding entry in the PID table, the parser 502 may accept the packets for parsing. After the packets are parsed, the parser 502 may tag the parsed packet with a tag. The tag may comprise the PID version number and PID channel number corresponding to the PID obtained from the PID table. The tag may be utilized for discarding of preprocessed information if a data channel is changed, thereby reducing artifacts after the channel change.

Figure 6:
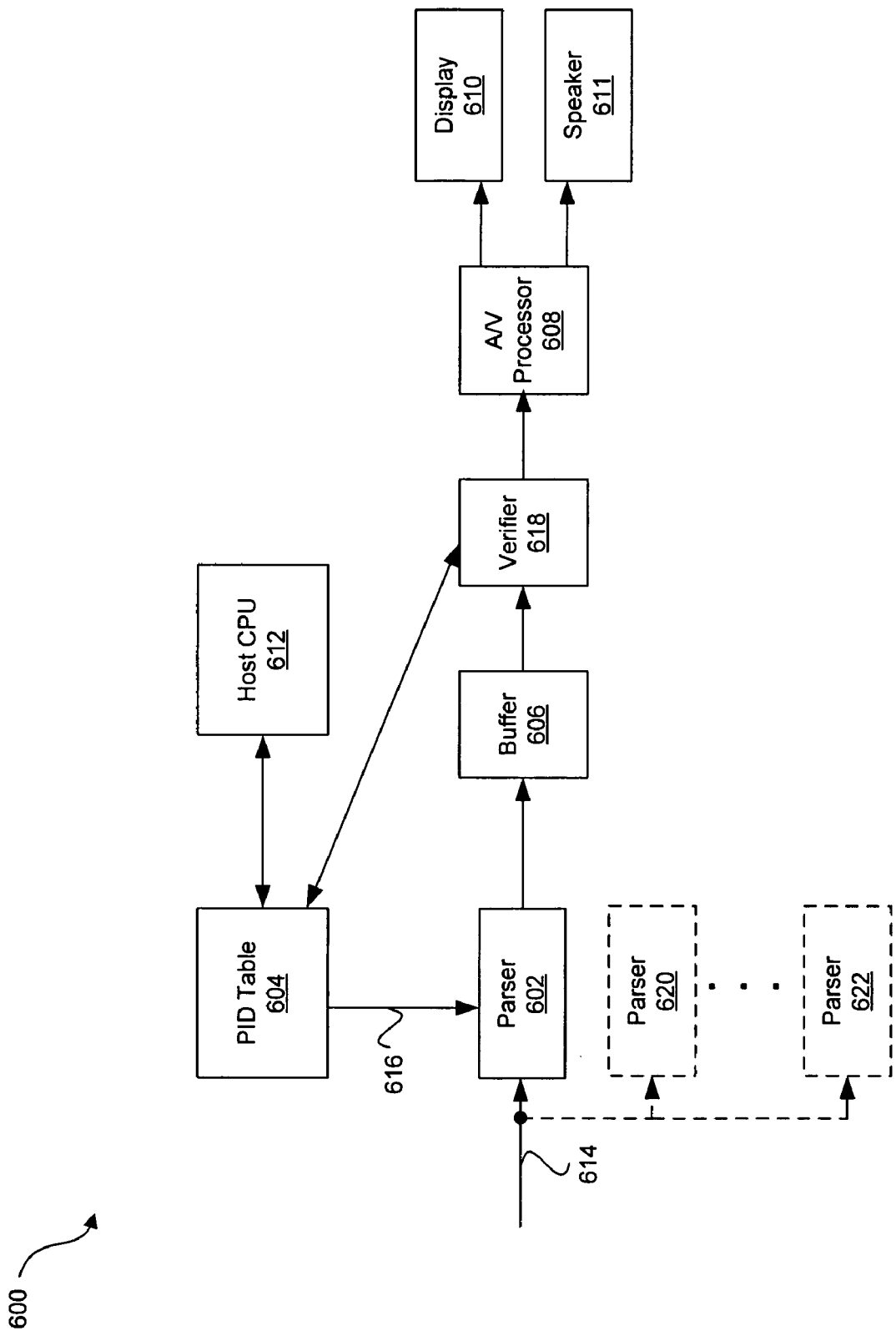
FIG. 6 is a block diagram of a system for processing information utilizing a PID table with a PID version number, in accordance with an embodiment of the invention.

FIG. 6 is a block diagram of a system for processing information utilizing a PID table with a PID version number, in accordance with an embodiment of the invention. Referring to FIG. 6, the system 600 for processing information may comprise a PID table 604, a parser 602, a buffer 606, a verifying block 618, an audio/video (A/V) processor 608, a display 610, and a speaker 611. The PID table 604 may be stored in memory and may be similar to the PID table 510 in FIG. 5. In this regard, the PID table 604 may comprise a plurality of entries, and each entry may comprise a PID version number, a parser band number entry, a validate bit entry, and a PID. The parser 602 may comprise suitable circuitry, logic, and/or code and may enable parsing of data content, associated with one or more data channels, within a received transport stream 614. The transport stream 614 may comprise a plurality of transport streams. In addition, the parser 602 may be identified by a parser band number. The parser band number may be utilized by the parser 602 to accept or reject table entries from the PID table 604. For example, parser 602 may be identified as parser band number 1.

In an exemplary embodiment of the invention, contents of the PID table 604 may be continuously broadcasted to the parser 602. In addition, the parser 602 may tag the parsed packet with a tag. The tag may comprise the PID version number and PID channel number corresponding to the PID obtained from the PID table 604. The buffer 606 may comprise suitable circuitry, logic, and/or code and may be enabled to buffer parsed data received from the parser 602.

The verifier block 618 may comprise suitable circuitry, logic, and/or code and may enable verifying whether the PID version number within a parsed data tag is identical to a PID version number associated with a current data channel. If the PID version number within the parsed data tag is not identical to the PID version number associated with the current data channel, the parsed data associated with the data tag may be discarded, thereby reducing artifacts after the channel change. If the PID version number within the parsed data tag is identical to the PID version number associated with the current data channel, the parsed data may be communicated to the A/V processor 608 for further processing, such as decoding. The A/V processor 608 may comprise suitable circuitry, logic, and/or code and may be enabled to process data received from the verifying block 618. For example, the A/V processor may be enabled to decode the received audio and/or video data.

In operation, the system 600 may receive a transport stream, such as the transport stream 614, which may be communicated to the parser 602. Table entries from the PID table 604 may be continuously transmitted to the parser 602 via connection 616. The parser 602 may receive the transport stream 614 and may parse content associated with a particular data channel. As table entries from the PID table 604 are transmitted to the parser 602, the parser 602 may accept or reject a table entry based on the parser band number field in each received PID table entry. Referring to FIGS. 4 and 6, PID table 604 may be the same as PID table 400. During the simultaneous transmission of the PID table entries from PID table 604, the parser 602 may initially read the parser band number from each PID table entry.

Since the parser 602 is identified as parser band number 1, for example, the parser 602 may accept PID table entries with parser band number field equal to 1, and reject all other PID table entries. For example, if parser band number field 402 equals 1, the parser 602 may accept entry 1 from PID table 400. The parser 602 may then check whether the validate bit 408 is asserted or de-asserted. If the validate bit 408 is asserted, the parser 602 may obtain the corresponding PID version number and PID from PID entry 414. The parser 602 may then parse program content within the transport stream 614 based on the PID obtained from PID table entry 414. In this regard, the parser 602 may parse packets which have the same PID number stored within the packet headers of program content within the transport stream 614. If the PIDs from the packet headers within the stream 614 do not match the PID obtained from the corresponding entry in the PID table 604, the parser 602 may reject the packets. Alternatively, if the PIDs from the packet headers match the PID obtained from the corresponding entry in the PID table, the parser 602 may accept the packets for parsing.

After the parser 602 parses the packets, the parsed packets may be tagged with a data tag. The data tag may comprise the PID version number and PID channel number from the corresponding PID table entry. For example, if PID 414 is used for parsing, the parsed packet may be tagged with PID version number from field 401a and the PID channel number, which equals 1. The parser 602 may communicate the parsed program content and its corresponding data tag to the buffer 606 for buffering.

The buffered parsed data and its corresponding tag may be communicated to the verifying block 618. In instances when a current data channel is changed, for example by a user, the host CPU 612 may store new PID information in a corresponding PID table entry associated with the new data channel. Consequently, a corresponding PID version number may be automatically incremented as a result of the CPU 612 storing the new PID information. The verifying block 618 may verify whether the PID version number within a parsed data tag is identical to a PID version number associated with the changed data channel. If the PID version number within the parsed data tag is not identical to the PID version number associated with the changed data channel, or the current data channel, the parsed data associated with the data tag may be discarded. For example, the parsed data may be discarded by the verifier block 618. If the PID version number within the parsed data tag is identical to the PID version number associated with the current data channel, the parsed data may be communicated to the A/V processor 608 for further processing, such as decoding. Decoded video information may be communicated to the display 610, and decoded audio information may be communicated to the speakers 611. Even though the system 600 comprises only one parser, the present invention may not be so limited and a plurality of parsers 620, . . . , 622 may also be utilized for parsing the transport stream 614.

In one embodiment of the invention, the host CPU 612 may enable tracking a number of times that at least one stored identifier that identifies program content for a particular data channel that is received via one of a plurality of multiplexed transport data streams is accessed. The host CPU 612 may enable discarding of at least a portion of the received program content 614 for the particular data channel based on the tracking. The stored identifier that identifies the program content for the particular data channel may comprise a packet identifier (PID) and/or a processor identifier associated with the PID that identifies at least one of a plurality of processors 602, 620, . . . , 622 that parses at least a portion of the program content for the particular data channel that is received via one of the plurality of multiplexed transport data streams 614. The host CPU 612 may enable incrementing of a counter that is utilized for the tracking of the number of times that the at least one stored identifier that identifies the program content for the particular data channel is accessed. In accordance with various embodiments of the invention, the tracking may be performed in hardware.

The host CPU 612 may enable storing of a value for the counter and the identifier in a table in memory. The host CPU 612 may enable indexing of the table in memory according to at least a portion of a plurality of data channels received via at least a portion of the plurality of multiplexed transport data streams. The at least the portion of the plurality of data channels may comprise a plurality of PID channels. The host CPU 612 may enable parsing of the program content for the particular data channel that is received via the one of the plurality of multiplexed transport data streams based on the at least one stored identifier.

The host CPU 612 may enable tagging of the parsed program content with supplemental identification information. The supplemental identification information may comprise an incremented count value of the number of times that the at least one stored identifier that identifies the program content for the particular data channel is accessed, and/or channel identification information associated with the particular data channel. The host CPU 612 may enable comparing of a current count value for the particular data channel with the incremented count value. The host CPU 612 may enable discarding of at least a portion of the parsed program content, if the current count value does not match the incremented count value.

Figure 7:
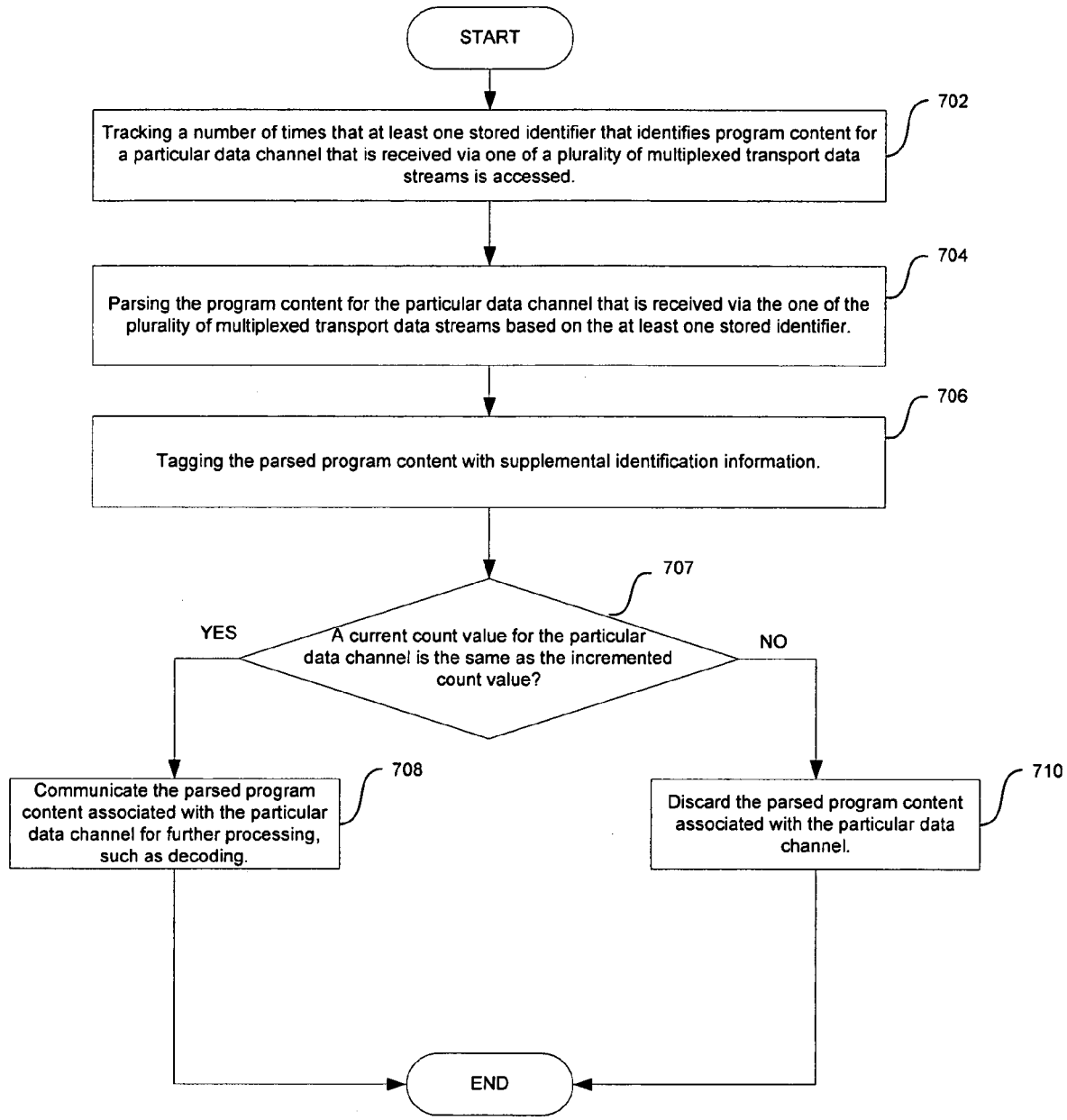
FIG. 7 is a flow diagram illustrating exemplary steps for processing information, in accordance with an embodiment of the invention.

FIG. 7 is a flow diagram illustrating exemplary steps for processing information, in accordance with an embodiment of the invention. Referring to FIGS. 6 and 7, at 702, the host CPU 612 may track a number of times that at least one stored identifier that identifies program content for a particular data channel that is received via one of a plurality of multiplexed transport data streams 614 is accessed. The identifier may be stored within the PID table 604. At 704, the parser 602 may parse the program content for the particular data channel that is received via the one of the plurality of multiplexed transport data streams 614 based on the at least one stored identifier.

At 706, the parser 602 may tag the parsed program content with supplemental identification information. The supplemental identification information may be received from the PID table 604 and may comprise an incremented count value of the number of times that the at least one stored identifier that identifies the program content for the particular data channel is accessed, and/or channel identification information associated with the particular data channel. At 707, it may be determined whether a current count value for the particular data channel is the same as the incremented count value. If the current count value for the particular data channel is the same as the incremented count value, at 708, the parsed program content associated with the particular data channel may be communicated to the A/V processor 608 for further processing, such as decoding. If the current count value for the particular data channel is not the same as the incremented count value, at 710, the parsed program content associated with the particular data channel may be discarded.

Another embodiment of the invention may provide a machine-readable storage having stored thereon, a computer program having at least one code section for processing media information, the at least one code section being executable by a machine for causing the machine to perform steps as disclosed herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing media information, the method comprising:
    performing by one or more processors and/or circuits within a single chip:
        tracking a number of times that at least one stored identifier is modified, said identifier identifying program content for a particular data channel that is received via one of a plurality of multiplexed transport data streams; and
        discarding at least a portion of said received program content for said particular data channel based on said tracking.

2. The method according to claim 1, wherein said at least one stored identifier that identifies said program content for said particular data channel comprises one or both of a packet identifier (PID) and/or a processor identifier associated with said PID that identifies at least one of a plurality of processors that parses at least a portion of said program content for said particular data channel that is received via one of said plurality of multiplexed transport data streams.

3. The method according to claim 1, comprising incrementing a counter that is utilized for said tracking of said number of times that said at least one stored identifier that identifies said program content for said particular data channel is modified.

4. The method according to claim 1, comprising performing said tracking in hardware.

5. The method according to claim 3, comprising storing a value for said counter and said at least one stored identifier in a table in memory.

6. The method according to claim 5, comprising indexing said table in memory according to at least a portion of a plurality of data channels received via at least a portion of said plurality of multiplexed transport data streams.

7. The method according to claim 6, wherein said at least said portion of said plurality of data channels comprises a plurality of PID channels.

8. The method according to claim 1, comprising parsing said program content for said particular data channel that is received via said one of said plurality of multiplexed transport data streams based on said at least one stored identifier.

9. The method according to claim 8, comprising tagging said parsed program content with supplemental identification information.

10. The method according to claim 9, wherein said supplemental identification information comprises one or both of an incremented count value of said number of times that said at least one stored identifier that identifies said program content for said particular data channel is accessed, and/or channel identification information associated with said particular data channel.

11. The method according to claim 10, comprising comparing a current count value for said particular data channel with said incremented count value.

12. The method according to claim 11, comprising, if said current count value does not match said incremented count value, discarding at least a portion of said parsed program content.

13. A system for processing media information, the system comprising: at least one processor that enables tracking of a number of times that at least one stored identifier is modified, said identifier identifying program content for a particular data channel that is received via one of a plurality of multiplexed transport data streams; a counter; and
    said at least one processor enables discarding of at least a portion of said received program content for said particular data channel based on said tracking.

14. The system according to claim 13, wherein said at least one stored identifier that identifies said program content for said particular data channel comprises one or both of a packet identifier (PID) and/or a processor identifier associated with said PID that identifies at least one of a plurality of processors that parses at least a portion of said program content for said particular data channel that is received via one of said plurality of multiplexed transport data streams.

15. The system according to claim 13, wherein said at least one processor enables incrementing of the counter that is utilized for said tracking of said number of times that said at least one stored identifier that identifies said program content for said particular data channel is modified.

16. The system according to claim 13, wherein said at least one processor enables performing of said tracking in hardware.

17. The system according to claim 15, wherein said at least one processor enables storing of a value for said counter and said at least one stored identifier in a table in a memory.

18. The system according to claim 17, wherein said at least one processor enables indexing of said table in said memory according to at least a portion of a plurality of data channels received via at least a portion of said plurality of multiplexed transport data streams.

19. The system according to claim 18, wherein said at least said portion of said plurality of data channels comprises a plurality of PID channels.

20. The system according to claim 13, wherein said at least one processor enables parsing of said program content for said particular data channel that is received via said one of said plurality of multiplexed transport data streams based on said at least one stored identifier.

21. The system according to claim 20, wherein said at least one processor enables tagging of said parsed program content with supplemental identification information.

22. The system according to claim 21, wherein said supplemental identification information comprises one or both of an incremented count value of said number of times that said at least one stored identifier that identifies said program content for said particular data channel is accessed, and/or channel identification information associated with said particular data channel.

23. The system according to claim 22, wherein said at least one processor enables comparing of a current count value for said particular data channel with said incremented count value.

24. The system according to claim 23, wherein said at least one processor enables discarding of at least a portion of said parsed program content, if said current count value does not match said incremented count value.

* * * * *